United States Patent
Hashimoto

(10) Patent No.: US 10,170,830 B2
(45) Date of Patent: Jan. 1, 2019

(54) DISPLAY DEVICE, PROJECTOR, AND COMMUNICATION DEVICE

(71) Applicant: Seiko Epson Corporation, Tokyo (JP)

(72) Inventor: Hiroyuki Hashimoto, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 15/387,348

(22) Filed: Dec. 21, 2016

(65) Prior Publication Data

US 2017/0187106 A1 Jun. 29, 2017

(30) Foreign Application Priority Data

Dec. 25, 2015 (JP) .................................. 2015-253433

(51) Int. Cl.
*H01Q 3/06* (2006.01)
*G09G 5/00* (2006.01)
*G03B 21/00* (2006.01)
*G03B 21/14* (2006.01)
*H01Q 5/30* (2015.01)
(Continued)

(52) U.S. Cl.
CPC ............ *H01Q 3/06* (2013.01); *G03B 21/006* (2013.01); *G03B 21/145* (2013.01); *G09G 5/006* (2013.01); *H01Q 1/523* (2013.01); *H01Q 5/30* (2015.01); *H01Q 21/28* (2013.01); *H01Q 21/30* (2013.01); *G09G 2370/16* (2013.01)

(58) Field of Classification Search
CPC ............ H01Q 3/06; H01Q 5/30; H01Q 1/523; H01Q 21/28; H01Q 21/30; G09G 5/006; G09G 2370/16; G03B 21/006; G03B 21/145

See application file for complete search history.

(56) References Cited

U.S. PATENT DOCUMENTS 5,552,798 A * 9/1996 Dietrich ................ H01Q 1/288
343/893
2012/0236131 A1* 9/2012 Kishimoto ......... H04N 13/0438
348/54
(Continued)

FOREIGN PATENT DOCUMENTS

JP 9-181519 A 7/1997
JP 2005-208418 A 8/2005
(Continued)

*Primary Examiner* — Hoang Nguyen

(74) *Attorney, Agent, or Firm* — ALG Intellectual Property, LLC

(57) ABSTRACT

A projector includes a wireless communication unit which wirelessly receives image data from a transmitting device, and a display unit which displays an image based on the image data received by the wireless communication unit. The wireless communication unit includes a first communication unit which has a first array antenna, and a second communication unit which has a second array antenna. The first communication unit transmits and receives wireless radio waves of a first frequency in a millimeter wave band via the first array antenna, and the second communication unit transmits and receives wireless radio waves of a second frequency in a millimeter wave band that is different from the first frequency via the second array antenna. A plane including the second array antenna is tilted at an angle of 10 degrees or more and 30 degrees or less to a plane including the first array antenna.

7 Claims, 8 Drawing Sheets

(51) Int. Cl.
*H01Q 1/52* (2006.01)
*H01Q 21/28* (2006.01)
*H01Q 21/30* (2006.01)

(56) References Cited

U.S. PATENT DOCUMENTS

2014/0242930 A1* 8/2014 Barker .................. H01Q 1/246
                                                                  455/129
2015/0222013 A1* 8/2015 Choi ..................... H01Q 1/246
                                                                  343/879

FOREIGN PATENT DOCUMENTS

| JP | 2007-329666 A | 12/2007 |
| JP | 2009-80181 A | 4/2009 |
| JP | 2009-516949 A | 4/2009 |
| JP | 2013-117660 A | 6/2013 |
| WO | WO-2007-057476 | 5/2007 |

* cited by examiner

|  | RECEIVING SENSITIVITY (%) | |
|---|---|---|
|  | SECOND COMMUNICATION UNIT | FIRST COMMUNICATION UNIT |
| 30 DEGREES AWAY FROM LENS | 100 | 100 |
| 40 DEGREES AWAY FROM LENS | 100 | 100 |
| 50 DEGREES AWAY FROM LENS | 100 | 100 |
| 60 DEGREES AWAY FROM LENS | 100 | 100 |
| 70 DEGREES AWAY FROM LENS | 100 | 100 |
| 80 DEGREES AWAY FROM LENS | 100 | 90 |
| FRONT | 100 | 100 |
| 30 DEGREES TOWARD LENS | 80-100 | 100 |
| 40 DEGREES TOWARD LENS | 70 | 100 |
| 50 DEGREES TOWARD LENS | 60 | 100 |

FIG. 5

| | RECEIVING SENSITIVITY (%) | |
|---|---|---|
| | SECOND COMMUNICATION UNIT | FIRST COMMUNICATION UNIT |
| 30 DEGREES AWAY FROM LENS | 100 | 100 |
| 40 DEGREES AWAY FROM LENS | 90 | 100 |
| 50 DEGREES AWAY FROM LENS | 90 | 100 |
| 60 DEGREES AWAY FROM LENS | 90 | 100 |
| 70 DEGREES AWAY FROM LENS | 90 | 100 |
| 80 DEGREES AWAY FROM LENS | 60 | 100 |
| FRONT | 100 | 100 |
| 30 DEGREES TOWARD LENS | 80-100 | 100 |
| 40 DEGREES TOWARD LENS | 70 | 100 |
| 50 DEGREES TOWARD LENS | 60 | 100 |

FIG. 7

DISPLAY DEVICE, PROJECTOR, AND COMMUNICATION DEVICE

The entire disclosure of Japanese Patent Application No. 2015-253433, filed Dec. 25, 2015 is expressly incorporated by reference herein.

BACKGROUND

1. Technical Field

The present invention relates to a display device, a projector, and a communication device.

2. Related Art

According to the related art, Wireless HD (high-definition) has been formulated as a communication standard utilizing wireless radio waves in a millimeter wave band (see JP-A-2013-117660, for example).

JP-A-2013-117660 discloses a projector having a Wireless HD receiver which receives image data transmitted from a Wireless HD transmitter.

Incidentally, in the case of wirelessly transmitting a large volume of image data to a display device, the provision of a plurality of communication units which carries out wireless communication with the display device is considered. In the case where a plurality of communication units is arranged closely to each other in a limited space within the display device and the plurality of communication units is made to simultaneously use radio waves in a plurality of different frequency bands, the radio waves generated from one communication unit may affect the communication by another communication unit, thus lowering the receiving sensitivity.

SUMMARY

An advantage of some aspects of the invention is that the reduction in the receiving sensitivity is restrained in a display device having a plurality of communication units.

A display device according to an aspect of the invention includes: a communication unit which wirelessly receives image data from an external device; and a display unit which displays an image based on the image data received by the communication unit. The communication unit includes a first communication unit which has a first array antenna, the first communication unit transmits and receives wireless radio waves of a first frequency in a millimeter wave band via the first array antenna, and a second communication unit which has a second array antenna, the second communication unit transmits and receives wireless radio waves of a second frequency in a millimeter wave band that is different from the first frequency via the second array antenna. A plane including the second array antenna is tilted at an angle of 10 degrees or more and 30 degrees or less to a plane including the first array antenna.

According to this configuration, the first communication unit and the second communication unit are installed in such a way that the plane including the second array antenna is tilted at an angle of 10 degrees or more and 30 degrees or less to the plane including the first array antenna. Therefore, the reduction in the receiving sensitivity of the first array antenna and the second array antenna can be restrained, compared with the case where the plane including the first array antenna and the plane including the second array antenna are arranged in parallel.

In the display device, a normal vector to the plane including the first array antenna and a normal vector to the plane including the second array antenna may be tilted from each other so as to be spaced apart from each other on a receiving surface side of the first and second array antennas.

According to this configuration, the normal vector to the plane including the first array antenna and the normal vector to the plane including the second array antenna are spaced apart from each other on the receiving surface side of the first and second array antennas. Therefore, the probability of one array antenna receiving the radio waves radiated from the other array antenna is reduced. Thus, the reduction in the receiving sensitivity of the first array antenna and the second array antenna can be restrained further.

In the display device, the first communication unit may execute beam steering within a predetermined angle range about a normal vector to the plane including the first array antenna, and the second communication unit may execute beam steering within a predetermined angle range about a normal vector to the plane including the second array antenna.

According to this configuration, the first communication unit executes beam steering within a predetermined angle range and the second communication unit executes beam steering within a predetermined angle range. Therefore, beam steering can be executed by the first communication unit and the second communication unit.

In the display device, the communication unit may transmit and receive the wireless radio waves of the first frequency via the first array antenna, transmit and receive the wireless radio waves of the second frequency via the second array antenna, and thus execute carrier aggregation.

According to this configuration, the first array antenna transmits and receives the wireless radio waves of the first frequency, and the second array antenna transmits and receives the wireless radio waves of the second frequency. Therefore, carrier aggregation can be executed.

A projector according to another aspect of the invention includes: a projection unit including a light source, a modulation unit which modulates light emitted from the light source, and a projection system which projects image light modulated by the modulation unit; a communication unit which wirelessly receives image data from an external device; and a casing accommodating the projection unit and the communication unit. The communication unit includes a first communication unit which has a first array antenna, the first communication unit transmits and receives wireless radio waves of a first frequency in a millimeter wave band via the first array antenna, and a second communication unit which has a second array antenna, the second communication unit transmits and receives wireless radio waves of a second frequency in a millimeter wave band that is different from the first frequency via the second array antenna. The first array antenna and the second array antenna are arranged on a predetermined side of the projection unit in the casing. A plane including the second array antenna is tilted at an angle of 10 degrees or more and 30 degrees or less to a plane including the first array antenna.

According to this configuration, the first communication unit and the second communication unit are installed in such a way that the plane including the second array antenna is tilted at an angle of 10 degrees or more and 30 degrees or less to the plane including the first array antenna. Therefore, the reduction in the receiving sensitivity of the first array antenna and the second array antenna can be restrained, compared with the case where the plane including the first array antenna and the plane including the second array antenna are arranged in parallel.

In the projector, the first array antenna may be installed in such a way that a normal vector to the plane including the first array antenna and an optical axis of a projection lens included in the projection system become parallel to each other. The second array antenna may be installed in such away that an angle formed by a normal vector to the plane including the second array antenna and the optical axis of the projection lens is 10 degrees or more and 30 degrees or less.

According to this configuration, the first array antenna is installed in such a way that the normal vector to the plane including the first array antenna and the optical axis of the projection lens become parallel to each other. The second array antenna is installed in such a way that the angle formed by the normal vector to the plane including the second array antenna and the optical axis of the projection lens is 10 degrees or more and 30 degrees or less. Therefore, the first communication unit can be arranged in such a way that the receiving surface of the first communication unit faces the direction of the optical axis of the projection lens. Also, the second communication unit can be arranged in such a way that the plane including the second array antenna is tilted at an angle of 10 degrees or more and 30 degrees or less to the plane including the first array antenna.

In the projector, the second communication unit may be arranged further toward a rear side which is opposite to a projecting direction of the projection lens than the first communication unit, in the direction of the optical axis of the projection lens.

According to this configuration, the second communication unit is arranged further toward the rear side than the first communication unit. Thus, the second communication unit can be arranged toward the surface side opposite to the receiving surface of the first communication unit. Therefore, the probability of one array antenna receiving the radio waves radiated from the other array antenna is reduced. Thus, the reduction in the receiving sensitivity of the first array antenna and the second array antenna can be restrained further.

A communication device according to still another aspect of the invention wirelessly communicates with an external device and includes: a first communication unit which has a first array antenna, the first communication unit transmits and receives wireless radio waves of a first frequency in a millimeter wave band via the first array antenna; a second communication unit which has a second array antenna, the second communication unit transmits and receives wireless radio waves of a second frequency in a millimeter wave band that is different from the first frequency via the second array antenna; and a casing accommodating the first array antenna and the second array antenna. A plane including the second array antenna is tilted at an angle of 10 degrees or more and 30 degrees or less to a plane including the first array antenna.

According to this configuration, the first communication unit and the second communication unit are installed in such a way that the plane including the second array antenna is tilted at an angle of 10 degrees or more and 30 degrees or less to the plane including the first array antenna. Therefore, the reduction in the receiving sensitivity of the first array antenna and the second array antenna can be restrained, compared with the case where the plane including the first array antenna and the plane including the second array antenna are arranged in parallel.

BRIEF DESCRIPTION OF THE DRAWINGS

The invention will be described with reference to the accompanying drawings, wherein like numbers reference like elements.

FIG. 5 shows the receiving sensitivity of the first communication unit and the second communication unit in the embodiment.

FIG. 7 shows the receiving sensitivity of the first communication unit and the second communication unit in a comparative example.

DESCRIPTION OF EXEMPLARY EMBODIMENTS

Hereinafter, an embodiment of the invention will be described with reference to the drawings.

Figure 1:
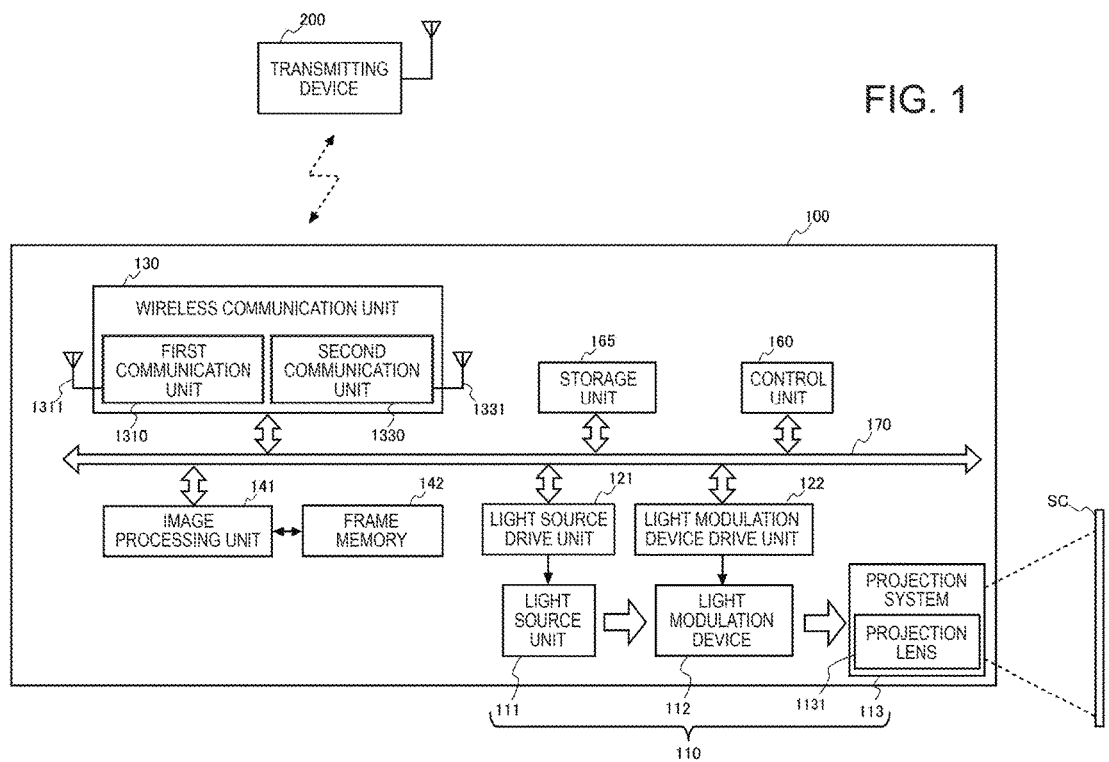
FIG. 1 is a block diagram showing the configuration of a projector.

FIG. 1 is a block diagram showing the configuration of a projector (display device, communication device) 100.

The projector 100 is wirelessly connected to a transmitting device (external device) 200 and projects an image based on image data received from the transmitting device 200 or image data stored in a storage unit 165 (see FIG. 1) of the projector 100, onto a projection target.

The transmitting device 200 and the projector 100 transmit and receive data to and from each other according to the Wireless HD communication standard. The transmitting device 200 transmits uncompressed image data as a wireless communication signal to the projector 100, utilizing the HRP (high0rate physical layer) communication method. The projector 100 extracts the image data from the wireless communication signal received from the transmitting device 200 and projects an image based on the extracted image data, onto a projection target. Also, the transmitting device 200 and the projector 100 transmit control information, utilizing the LRP (low-rate physical layer) communication method.

The transmitting device 200 is connected to an image supply device (not illustrated), converts image data supplied from the image supply device into a wireless communication signal, and transmits the wireless communication signal to the projector 100. The image supply device includes a video output device such as a video playback device, DVD (digital versatile disk) playback device, television tuner device, CATV (cable television) set top box, and video game device, or a personal computer or the like.

Also, the projection target on which the projector 100 projects an image may be an object that is not uniformly flat, such as a building or object. The projection target may be a screen SC or a flat projection surface such as a wall surface of a building. FIG. 1 shows a flat screen SC as the projection target.

The projector 100 roughly includes a display unit (projection unit) 110 which forms an optical image, and an image processing system which electrically processes the image displayed by the display unit 110. First, the display unit 110 will be described. The display unit 110 has a light source unit 111, a light modulation device 112, and a projection system 113. The light modulation device 112 and the projection system 113 of the display unit 110 are accommodated inside the casing of the projector 100.

The light source unit 111 has a light source made up of a xenon lamp, ultra-high-pressure mercury lamp, LED (light emitting diode) or the like. The light source unit 111 can also have a reflector and an auxiliary reflector for guiding the light emitting from the light source, to the light modulation device 112. The light source unit 111 may also be configured having a lens group for enhancing optical characteristics of the light projected on the screen SC, a polarizer, or a light control element or the like for reducing the amount of the light emitted from the light source on the path to the light modulation device 112 (none of these components are illustrated).

The light source unit 111 is driven by a light source drive unit 121. The light source drive unit 121 is connected to an internal bus 170 and operates under the control of a control unit 160 connected to the internal bus 170. The light source drive unit 121 switches on and off the light source of the light source unit 111 under the control of the control unit 160.

The light modulation device (modulation unit) 112 has a liquid crystal panel made up of a pair of transparent substrates with liquid crystal enclosed between them. This liquid crystal panel has a rectangular pixel area where a plurality of pixels is arranged in the form of a matrix.

The light modulation device 112 is driven by a light modulation device drive unit 122. The light modulation device drive unit 122 is connected to the internal bus 170 and drives the light modulation device 112 under the control of the control unit 160. The light modulation device drive unit 122 applies a drive voltage to each pixel in the liquid crystal panel and thus controls the light transmittance of each pixel, thereby generating image light.

The projection system 113 has a projection lens 1131. The projection lens 1131 includes a zoom lens (not illustrated) for enlarging/reducing the image to be projected and for adjusting its focus. The projection system 113 projects the image light modulated by the light modulation device 112 onto the screen SC and thus forms an image thereon.

The projector 100 has a wireless communication unit 130. The wireless communication unit 130 is connected to the internal bus 170. The wireless communication unit 130 has a first communication unit 1310 and a second communication unit 1330.

The first communication unit 1310 has a first array antenna 1311 and transmits and receives wireless radio waves in a millimeter wave band to and from the transmitting device 200. The first communication unit 1310 demodulates a wireless communication signal received by the first array antenna 1311 into a digital signal and subsequently extracts image data and a predetermined control command from the digital signal by predetermined separation processing. The first communication unit 1310 outputs the extracted image data to the image processing unit 141 and outputs the extracted control command to the control unit 160.

The second communication unit 1330 has a second array antenna 1331 and transmits and receives wireless radio waves in a millimeter wave band to and from the transmitting device 200. The second communication unit 1330 demodulates a wireless communication signal received by the second array antenna 1331 into a digital signal and subsequently extracts image data and a predetermined control command from the digital signal by predetermined separation processing. The second communication unit 1330 outputs the extracted image data to the image processing unit 141 and outputs the extracted control command to the control unit 160.

The first array antenna 1311 of the first communication unit 1310 has a plurality of antenna elements (not illustrated) arranged regularly and forming an antenna surface (surface including the array antenna). The plurality of antenna elements is formed on a first antenna substrate 1312 (see FIG. 2). The surface formed by the plurality of antenna elements that is arranged regularly is referred to as an antenna surface. Also, the surface on the side where the antenna elements of the first antenna substrate 1312 are formed is referred to as a receiving surface.

The frequency of radio waves radiated or received by the first array antenna 1311 is a fixed constant frequency roughly within a range of 10 GHz to 300 GHz (millimeter wave band or quasi-millimeter wave band). However, the advantageous effects achieved by the invention are not necessarily limited to an array antenna which handles radio waves within the above frequency band. For example, radio waves with high directivity and straightness such as centimeter waves (3 to 30 GHz) or submillimeter waves (300 GHz to 3 THz) may also be employed.

The second array antenna 1331 of the second communication unit 1330 has a plurality of antenna elements (not illustrated) arranged regularly and forming an antenna surface (surface including the array antenna). The plurality of antenna elements is formed on a second antenna substrate 1332 (see FIG. 2). The surface formed by the plurality of antenna elements that is arranged regularly is referred to as an antenna surface. Also, the surface on the side where the antenna elements of the second antenna substrate 1332 are formed is referred to as a receiving surface.

The frequency of radio waves radiated or received by the second array antenna 1331 is a fixed constant frequency roughly within a range of 10 GHz to 300 GHz (millimeter wave band or quasi-millimeter wave band). However, the advantageous effects achieved by the invention are not necessarily limited to an array antenna which handles radio waves within the above frequency band. For example, radio waves with high directivity and straightness such as centimeter waves (3 to 30 GHz) or submillimeter waves (300 GHz to 3 THz) may also be employed.

The frequency channel used by the first communication unit 1310 to communicate with the transmitting device 200 is different from the frequency channel used by the second communication unit 1330 to communicate with the transmitting device 200. The wireless communication unit 130 executes carrier aggregation by communications using the first communication unit 1310 and the second communication unit 1330 with different frequency channels from each other.

Also, the frequency of the frequency channel used by the first communication unit 1310 for communication and the frequency of the frequency channel used by the second communication unit 1330 for communication are close to each other.

The first communication unit 1310 and the second communication unit 1330 carry out beam steering under the control of the control unit 160, described later. The beam steering refers to detecting wireless radio waves radiated from the transmitting device 200 and directing the directivities of the first and second array antennas 1311, 1331 to the direction in which the wireless radio waves radiated from the transmitting device 200 are present.

The range of beam steering executable by the first communication unit 1310 is an angle range such that, based on the direction of the normal vector to the first antenna substrate 1312 of the first communication unit 1310, the angle formed with the normal vector is 55 to 60 degrees.

The range of beam steering executable by the second communication unit 1330 is an angle range such that, based on the direction of the normal vector to the second antenna substrate 1332 of the second communication unit 1330, the angle formed with the normal vector is 55 to 60 degrees.

The first communication unit 1310 functions as a main communication unit, and the second communication unit 1330 functions as a sub communication unit. For example, when image data transmitted from the transmitting device 200 is a large volume of image data such as 4K, the projector 100 receives the wireless communication signal transmitted from the transmitting device 200, by the first communication unit 1310 and the second communication unit 1330. Meanwhile, when the volume of image data transmitted from the transmitting device 200 is small, the projector 100 receives the wireless communication signal transmitted from the transmitting device 200, by a part of the first communication unit 1310 and the second communication unit 1330 (for example, by the first communication unit 1310).

The image processing system of the projector 100 is made up mainly of the control unit 160 controlling the projector 100 and also includes an image processing unit 141, a frame memory 142, and a storage unit 165. The control unit 160, the image processing unit 141, and the storage unit 165 are connected to the internal bus 170.

The image processing unit 141 determines the attributes of the image data inputted from the wireless communication unit 130, under the control of the control unit 160. For example, the image processing unit 141 determines the image size and resolution, whether the image is a 2D (planar) image or 3D (stereoscopic) image, whether the image is a still image or dynamic image, the frame rate and the like. The image processing unit 141 develops each frame of the inputted image data in the frame memory 142 and executes image processing on the developed image data. The image processing executed by the image processing unit 141 includes, for example, resolution conversion processing, digital zoom processing, color tone correction processing, luminance correction processing, shape correction processing and the like. The image processing unit 141 executes processing designated by the control unit 160, and when necessary, carries out the processing using a parameter inputted from the control unit 160. Also, a combination of a plurality of types of processing, of the above, can be executed.

The image processing unit 141 reads out the image data on which the image processing has been completed, from the frame memory 142, and outputs the read-out image data to the light modulation device drive unit 122 as display image data. The light modulation device drive unit 122 generates image signals of the respective colors of R, G, B based on the display image data inputted from the image processing unit 141. The light modulation device drive unit 122 drives the liquid crystal panels of the corresponding colors in the light modulation device 112 on the basis of the generated image signals of R, G, B and draws an image on the liquid crystal panels of the respective colors.

The control unit 160 has, as its hardware, a CPU (central processing unit), a ROM (read only memory), a RAM (random access memory) and the like, not illustrated. The control unit 160 causes the CPU to execute a basic control program stored in the ROM and an application program stored in the storage unit 165 and thus controls each part of the projector 100.

The control unit 160 also controls each part of the projector 100 in response to a control command inputted from the wireless communication unit 130 and thus projects an image onto the projection target.

The storage unit 165 is made up of a non-volatile memory such as a flash memory or EEPROM. The storage unit 165 stores data processed by the control unit 160 and the control program executed by the control unit 160.

Figure 2:
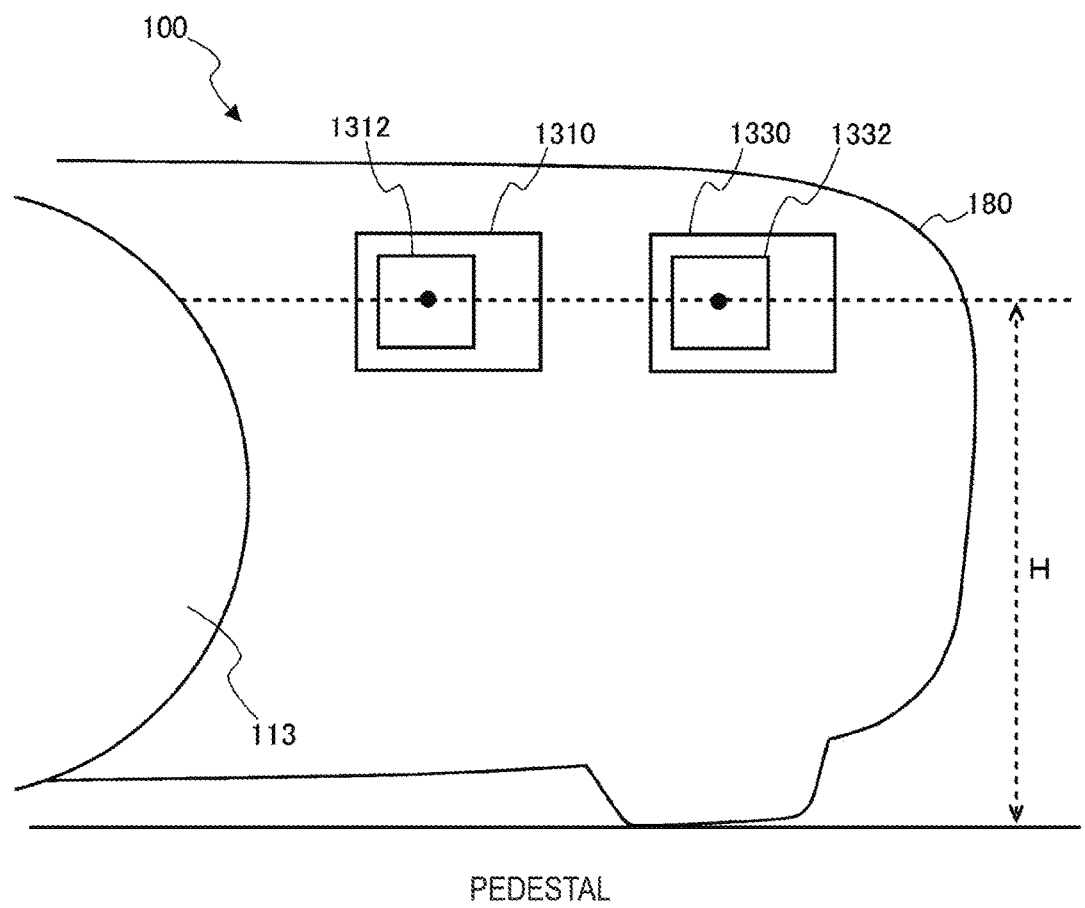
FIG. 2 shows the positions of installation of a first communication unit and a second communication unit.

FIG. 2 shows the positions of installation of the first communication unit 1310 and the second communication unit 1330. Particularly, FIG. 2 shows the state where the projector 100 is viewed from the front.

The first communication unit 1310 and the second communication unit 1330 are provided on a front surface side of the main body of the projector 100. The front surface of the main body of the projector 100 refers to the side where the projection system 113 is provided, of the main body of the projector 100, and the surface facing the projection target at the time of projecting an image on the projection target. While the case where the first communication unit 1310 and the second communication unit 1330 are provided on the front surface side of the main body of the projector 100 is described in this embodiment, at least one of the first communication unit 1310 and the second communication unit 1330 may be provided on a surface that is not the front surface of the main body of the projector 100, for example, on a lateral surface or the like.

The reason for providing the first communication unit 1310 and the second communication unit 1330 on the front surface side is to maintain a good communication state with the transmitting device 200, for example, even in the state where the projector 100 is installed inside a housing rack or the like, with the surfaces except the front surface of the projector 100 being surrounded by the housing rack.

The first communication unit 1310 and the second communication unit 1330 are arranged on one side of the projection system 113, inside a casing 180 of the projector 100. While FIG. 2 shows an example where the first communication unit 1310 and the second communication unit 1330 are arranged on the right when facing the projector 100, the first communication unit 1310 and the second communication unit 1330 may also be arranged on the left when facing the projector 100.

The reason for arranging the first communication unit 1310 and the second communication unit 1330 on one side of the projection system 113 is to minimize the time during which the communication with the transmitting device 200 is interrupted. If a person or the like crosses the space between the projector 100 and the transmitting device 200, radio waves may be interrupted, making the projected image invisible. In order to minimize the time during which radio waves are interrupted, the first communication unit 1310 and the second communication unit 1330 are arranged on one side of the projection system 113.

Also, the first communication unit 1310 and the second communication unit 1330 are installed in the main body of the projector 100 in such a way that these communication units have the same height in the horizontal direction.

In the example shown in FIG. 2, the first communication unit 1310 and the second communication unit 1330 are installed in the main body of the projector 100 in such a way that the heights H from the pedestal where the projector 100 is placed to the centers of the antenna substrates 1312, 1332 of the respective communication units 1310, 1330 are the same.

Figure 3:
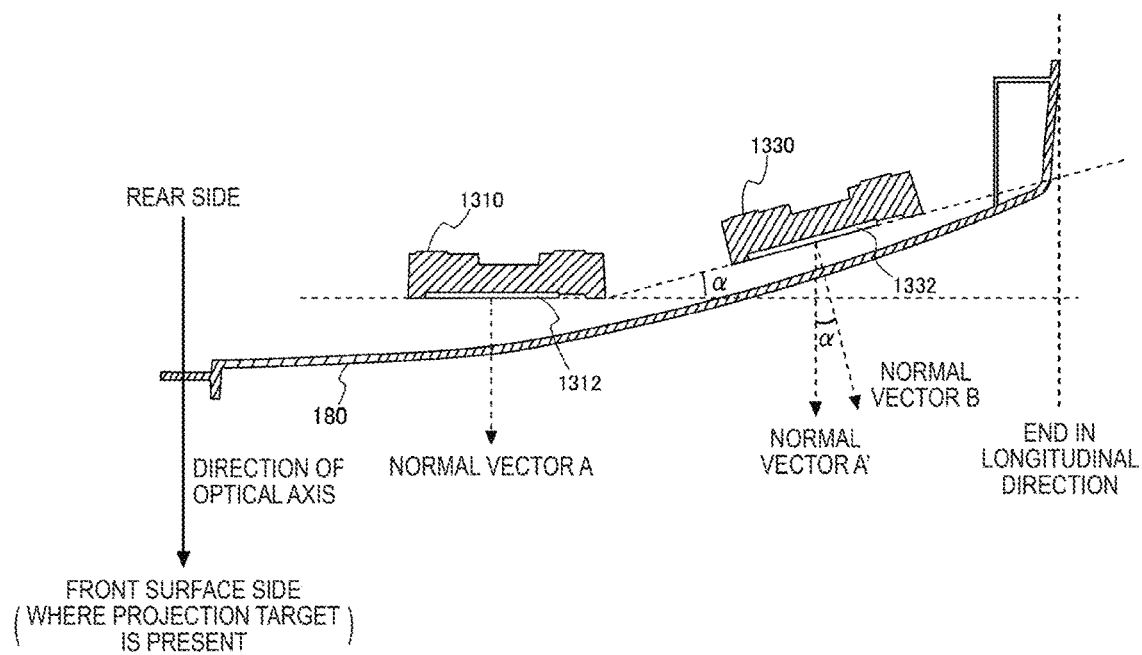
FIG. 3 shows the positions of installation of the first communication unit and the second communication unit.

FIG. 3 shows the positions of installation of the first communication unit 1310 and the second communication unit 1330. Particularly, FIG. 3 shows the state where the projector 100 is horizontally sliced and viewed from above.

The first communication unit 1310 and the second communication unit 1330 are installed in the main body of the projector 100, with the first antenna substrate 1312 and the second antenna substrate 1332 facing the front surface side. More specifically, the communication units are installed with the receiving surfaces of the first antenna substrate 1312 and the second antenna substrate 1332 facing the front surface side.

The second communication unit 1330 is arranged further to the rear side than the first communication unit 1310, in the direction of the optical axis of the projection lens 1131 provided in the projection system 113. The rear side refers to the side opposite to the projecting direction in which the projection lens 1131 of the projection system 113 projects an image, in the direction of the optical axis.

Also, the first communication unit 1310 and the second communication unit 1330 are installed in the main body of the projector 100 in such a way that the antenna surface of the second communication unit 1330 is tilted at an angle of 10 degrees or more and 30 degrees or less to the antenna surface of the first communication unit 1310. More preferably, the first communication unit 1310 and the second communication unit 1330 are installed in the main body of the projector 100 in such a way that the antenna surface of the second communication unit 1330 is tilted at an angle of 15 degrees or more and 25 degrees or less to the antenna surface of the first communication unit 1310.

FIG. 3 shows the case where a plurality of antenna elements of the first array antenna 1311 is formed on the first antenna substrate 1312 and where the antenna surface formed by the plurality of antenna elements coincides with the first antenna substrate 1312. FIG. 3 also shows the case where a plurality of antenna elements of the second array antenna 1331 is formed on the second antenna substrate 1332 and where the antenna surface formed by the plurality of antenna elements coincides with the second antenna substrate 1332.

The first antenna substrate 1312 of the first communication unit 1310 and the second antenna substrate 1332 of the second communication unit 1330 shown in FIG. 3 are installed in the main body of the projector 100 in such a way as to be tilted from each other. The angle α formed by the first antenna substrate 1312 and the second antenna substrate 1332 is preferably set to be 10 degrees or more and 30 degrees or less, and more preferably 15 degrees or more and 25 degrees or less.

The normal vector passing through the center of the first antenna substrate 1312 is defined as a normal vector A (see FIG. 3). The direction of the normal vector A is parallel to the direction of the optical axis of the projection lens 1131. The normal vector passing through the center of the second antenna substrate 1332 is defined as a normal vector B (see FIG. 3). The normal vector A shifted to the position passing through the center of the second antenna substrate 1332 is expressed as a normal vector A' (see FIG. 3). The angle α formed by the normal vector A' and the normal vector B is preferably 10 degrees or more and 30 degrees or less, and more preferably 15 degrees or more and 25 degrees or less.

The first antenna substrate 1312 and the second antenna substrate 1332 are tilted so that the normal vector A and the normal vector B are spaced apart from each other on the receiving surface side of each substrate. That is, the normal vector B to the second antenna substrate 1332 is not directed to the side where the first antenna substrate 1312 is present, but is directed to the side where the first antenna substrate 1312 is not present (that is, opposite to the position where the first antenna substrate 1312 is present), specifically, toward the end in the longitudinal direction of the projector 100.

Figure 4:
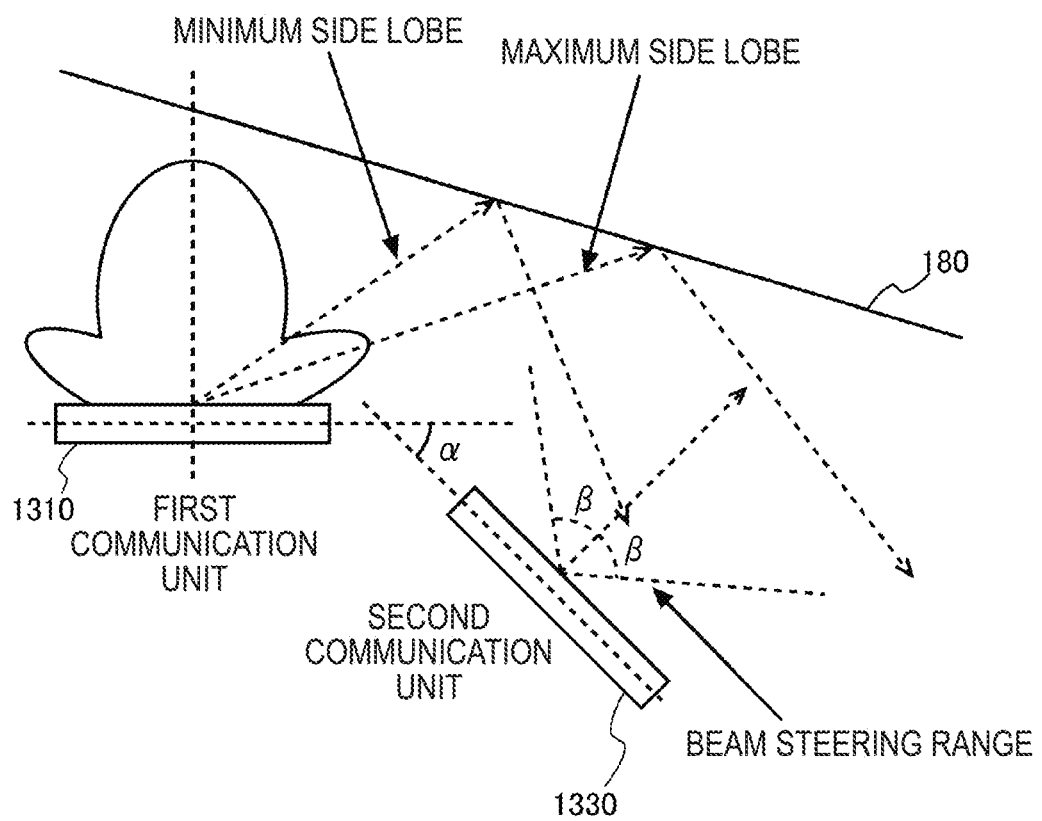
FIG. 4 illustrates the reason for installing the first communication unit and the second communication unit in such a way as to be tilted from each other.

FIG. 4 illustrates the reason for installing the first antenna substrate 1312 of the first communication unit 1310 and the second antenna substrate 1332 of the second communication unit 1330 in the main body of the projector 100 in such a way as to be tilted from each other.

FIG. 4 shows the directivity of radio waves radiated form the first communication unit 1310. The radio waves radiated from the first communication unit 1310 are also radiated intensely as side lobes to the side which is on the side of the second communication unit 1330, as well as the front surface side of the projector 100, which is on the side of the transmitting device 200. The same applies to the second communication unit 1330.

The unwanted radiation as side lobes has low electric power but include harmonics. Therefore, in an environment where the first communication unit 1310 and the second communication unit 1330 are arranged closely to each other, this unwanted radiation affects the neighboring frequency channel (the frequency used by the second communication unit 1330 for communication). Due to the influence of the side lobes, the beam steering of the second communication unit 1330 may be disrupted and the directivity of the second array antenna 1331 may not be able to be directed toward the transmitting device 200, which is the correct direction. That is, the side lobes of the radio waves radiated from the first communication unit 1310 may be detected as radio waves transmitted from the transmitting device 200.

Similarly, with the first communication unit 1310, the directivity of the first array antenna 1311 may not be able to be directed toward the transmitting device 200. That is, the side lobes of the radio waves radiated from the second communication unit 1330 may be detected as radio waves transmitted from the transmitting device 200.

Thus, in the embodiment, the second antenna substrate 1332 of the second communication unit 1330 is arranged further to the rear side in the direction of the optical axis than the first antenna substrate 1312 of the first communication unit 1310. Also, the first antenna substrate 1312 of the first communication unit 1310 and the second antenna substrate 1332 of the second communication unit 1330 are installed in the main body of the projector 100 in such a way as to be tilted from each other. This tilt is set in such a way that the second antenna substrate 1332 of the second communication unit 1330 is tilted at an angle of 10 degrees or more and 30 degrees or less to the first antenna substrate 1312 of the first communication unit 1310. Moreover, the normal vector A to the first antenna substrate 1312 of the first communication unit 1310 and the normal vector B to the second antenna substrate 1332 of the second communication unit 1330 are tilted from each other so as to be spaced apart on the receiving surface side.

Thus, the second communication unit 1330 is arranged on the surface side opposite to the receiving surface of the first communication unit 1310, as shown in FIG. 4. Therefore, with the first antenna substrate 1312 blocking radio waves radiated from the first communication unit 1310, the probability of the second communication unit 1330 receiving side lobes of radio waves radiated from the first communication unit 1310 can be reduced.

Similarly, with the second antenna substrate 1332 blocking radio waves radiated from the second communication unit 1330, the probability of the first communication unit 1310 receiving side lobes of radio waves radiated from the second communication unit 1330 can be reduced.

The installation of the first antenna substrate 1312 of the first communication unit 1310 and the second antenna substrate 1332 of the second communication unit 1330 in such a way as to be tilted from each other in the main body of the projector 100 has the following effects.

The probability of the second antenna substrate 1332 receiving a reflected wave of the radio wave with the highest electric field intensity reflected by the casing 180 of the projector 100, of the side lobes of the radio waves radiated from the first antenna substrate 1312, can be reduced. Therefore, in the beam steering executed by the second communication unit 1330, the probability that the direction of the radio waves radiated from the first antenna substrate 1312 is determined as the direction of the transmitting device 200 can be reduced.

Also, a reflected wave of the radio wave with the lowest electric field intensity reflected by the casing 180 of the projector 100, of the side lobes of the radio waves radiated from the first antenna substrate 1312, can be received by the second antenna substrate 1332. Therefore, in the beam steering executed by the second communication unit 1330, the probability that the direction of radio waves with a higher electric field intensity than the radio waves of the side lobes is determined as the direction of the transmitting device 200 can be increased.

The same applies to the beam steering executed by the first communication unit 1310.

The angle β from the normal direction to the second antenna substrate 1332 shown in FIG. 4 indicates the detection range of the beam steering executed by the second communication unit 1330.

Figure 6:
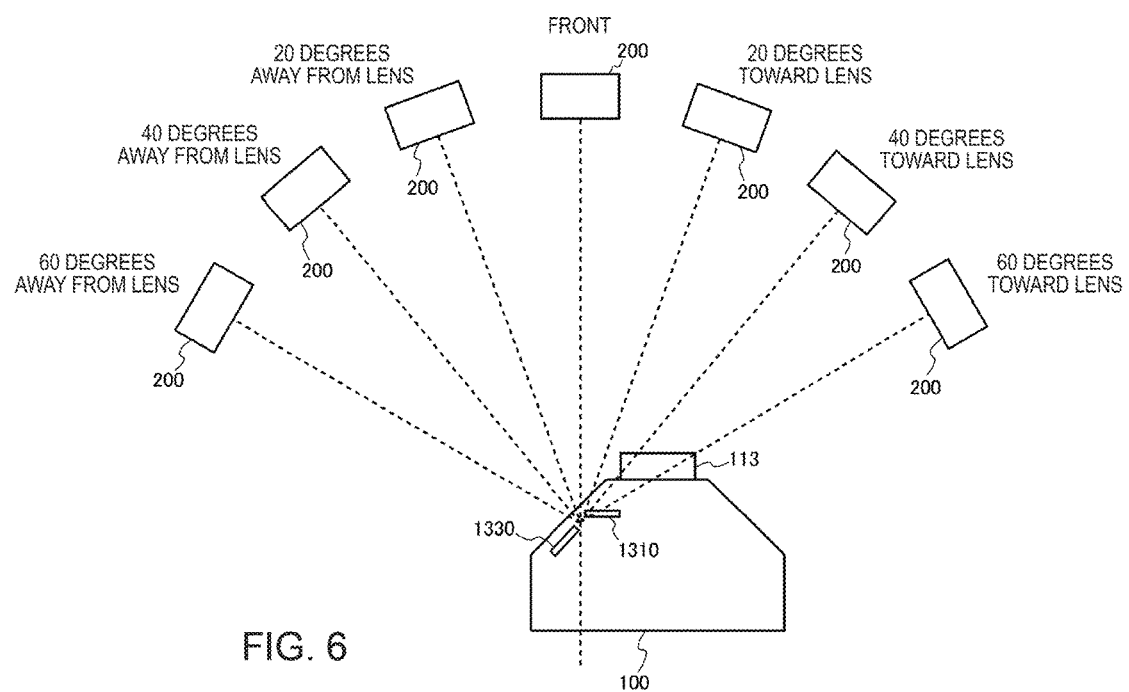
FIG. 6 illustrates the position of arrangement of a transmitting device.

FIG. 5 shows the receiving sensitivity of the first communication unit 1310 and the second communication unit 1330 in the case where the arrangement of the transmitting device 200 with respect to the projector 100 is changed. FIG. 6 shows the position of the transmitting device 200.

The front shown in FIG. 5 refers to the state where the transmitting device 200 is installed with respect to the projector 100 in such a way that a centerline passing through the center of the transmitting device 200 passes through an intermediate point between the first communication unit 1310 and the second communication unit 1330, as shown in FIG. 6.

The 30 degrees toward the lens refers to the state where the position of installation of the transmitting device 200 is shifted toward the projection system 113 and installed with respect to the projector 100 in such a way that the angle formed with the centerline in the case of arranging the transmitting device 200 in front of the projector 100 is 30 degrees.

Similarly, the 40 degrees and 50 degrees toward the lens refer to the states the state where the transmitting device 200 is shifted toward the projection system 113 and installed in such a way that the angle formed with the foregoing is 40 degrees and 50 degrees, respectively.

Meanwhile, the 30 degrees away from the lens refers to the state where the position of installation of the transmitting device 200 is to the side opposite to the projection system 113 and installed with respect to the projector 100 in such a way that the angle formed with the centerline in the case of arranging the transmitting device 200 in front of the projector 100 is 30 degrees.

Similarly, the 40 degrees, 50 degrees, 60 degrees, 70 degrees, and 80 degrees away from the lens refer to the states where the transmitting device 200 is shifted to the side opposite to the projection system 113 and installed in such a way that the angle formed with the foregoing centerline is 40 degrees, 50 degrees, 60 degrees, 70 degrees, and 80 degrees, respectively.

FIG. 5 shows the receiving sensitivity of the first communication unit 1310 and the second communication unit 1330 in the case where the first communication unit 1310 and the second communication unit 1330 are provided in such away that the antenna surface of the second communication unit 1330 is tilted at an angle of 20 degrees to the antenna surface of the first communication unit 1310. The receiving sensitivity is a value indicating the communication quality calculated on the basis of packet error rate. The packet error rate is an indicator value indicating whether packets are received normally or not. The value of 100% indicates the best quality.

Referring to FIG. 5, in the case where the transmitting device 200 is placed at the positions of 30 degrees to 70 degrees away from the lens, the front, and the positions of 30 degrees to 50 degrees toward the lens, it is determined that the first communication unit 1310 has the receiving sensitivity of 100(%), that is, in the state of the best communication quality. Even in the case where the transmitting device 200 is placed at the position of 80 degrees away from the lens, the receiving sensitivity of 90(%) is achieved.

Referring to FIG. 5 again, the second communication unit 1330 has the receiving sensitivity of 100(%) in the case where the transmitting device 200 is placed at the positions of 30 degrees to 80 degrees away from the lens and the front. Even in the case where the transmitting device 200 is placed at the position of 30 degrees toward the lens, the receiving sensitivity of 80(%) to 100(%) is achieved. Meanwhile, in the case where the transmitting device 200 is placed at the positions of 40 degrees and 50 degrees toward the lens, the receiving sensitivity is 70% and 60%, respectively.

Figure 8:
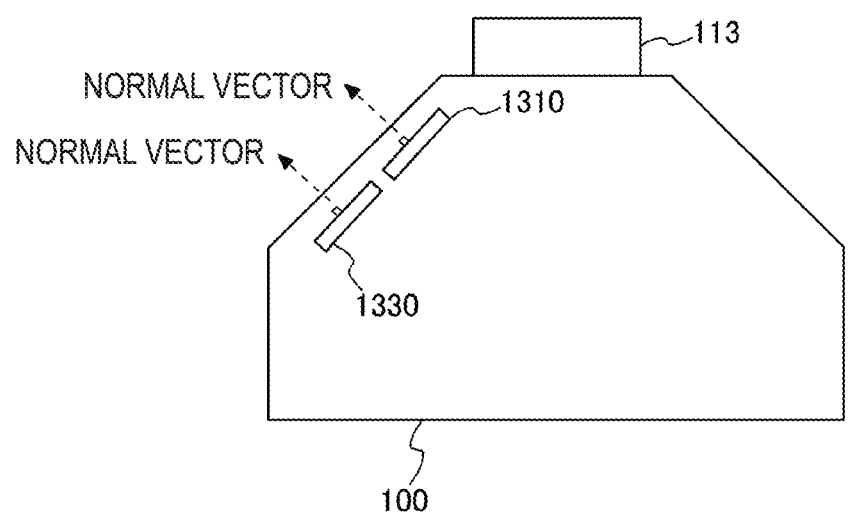
FIG. 8 shows the state where the first communication unit and the second communication unit are arranged in such a way that the normal vectors to the respective units become parallel to each other.

FIG. 7 shows the receiving sensitivity (%) of the first communication unit 1310 and the second communication unit 1330 in the case where the first communication unit 1310 and the second communication unit 1330 are arranged in such a way that the normal vectors to these communication units are parallel to each other. FIG. 8 shows an example of the state where the first communication unit 1310 and the second communication unit 1330 are arranged in such a way that the normal vectors to these communication units are parallel to each other.

Referring to FIG. 7, the first communication unit 1310 achieves the receiving sensitivity of 100(%) even in the case where the position of the transmitting device 200 is changed to the positions of 30 degrees to 80 degrees away from the lens, the front, and the positions of 30 degrees to 50 degrees toward the lens. However, with the second communication unit 1330, the receiving sensitivity drops to 90(%) in the case where the transmitting device 200 is arranged at the positions of 40 degrees to 70 degrees away from the lens, and the receiving sensitivity further drops to 60(%) in the case where the transmitting device 200 is arranged at the position of 80 degrees away from the lens. Meanwhile, the receiving sensitivity of the second communication unit 1330 in the case where the transmitting device 200 is arranged toward the lens is the same as that of the second communication unit 1330 in the embodiment.

As described above, an embodiment of the display device, the projector, and the communication device according to the invention includes the wireless communication unit 130, which wirelessly receives image data from the transmitting device 200, and the display unit 110, which displays an image based on the image data received by the wireless communication unit 130.

The wireless communication unit 130 has the first communication unit 1310, which transmits and receives wireless radio waves in a millimeter wave band via the first array antenna 1311, and the second communication unit 1330, which transmits and receives wireless radio waves of the second frequency in a millimeter wave band that is different from the first frequency via the second array antenna 1331. The plane including the second array antenna 1331 is tilted at an angle of 10 degrees or more and 30 degrees or less to the plane including the first array antenna 1311.

Therefore, the reduction in the receiving sensitivity of the first array antenna 1311 and the second array antenna 1331 can be restrained, compared with the case where the plane including the first array antenna 1311 and the plane including the second array antenna 1331 are arranged parallel to each other.

The normal vector to the plane including the first array antenna 1311 and the normal vector to the plane including the second array antenna 1331 are tilted from each other so as to be spaced apart from each other on the receiving surface side of the first and second array antennas 1311, 1331.

Therefore, the probability of the radio waves radiated from the one array antenna 1311 (1331) being received by the other array antenna 1331 (1311) is reduced, and the reduction in the sensitivity of the first and second array antennas 1311, 1331 can be thus restrained further.

The first communication unit 1310 executes beam steering within a predetermined angle range about the normal vector to the plane including the first array antenna 1311. The second communication unit 1330 executes beam steering within a predetermined angle range about the normal vector to the plane including the second array antenna 1331. Therefore, beam steering can be executed by the first communication unit 1310 and the second communication unit 1330.

The wireless communication unit 130 transmits and receives wireless radio waves of the first frequency via the first array antenna 1311 and transmits and receives wireless radio waves of the second frequency via the second array antenna 1331. Therefore, carrier aggregation can be executed by the first communication unit 1310 and the second communication unit 1330.

The first array antenna 1311 is installed in such a way that the normal vector to the plane including the first array antenna 1311 and the optical axis of the projection lens 1131 are parallel to each other.

The second array antenna 1331 is installed in such a way that the angle formed by the normal vector to the plane including the second array antenna 1331 and the optical axis of the projection lens 1131 is 10 degrees or more and 30 degrees or less.

Therefore, the first communication unit 1310 can be arranged in such a way that the receiving surface of the first communication unit 1310 faces in the direction of the optical axis of the projection lens 1131. Also, the second communication unit 1330 can be installed in such a way that the plane including the second array antenna 1331 is tilted at an angle of 10 degrees or more and 30 degrees or less to the plane including the first array antenna 1311.

The second communication unit 1330 is arranged further toward the rear side opposite to the projecting direction of the projection lens 1131 than the first communication unit 1310, in the direction of the optical axis of the projection lens 1131.

Therefore, with the first antenna substrate 1312 blocking the radio waves radiated from the first communication unit 1310, the probability of the second communication unit 1330 receiving side lobes of the radio waves radiated from the first communication unit 1310 can be reduced. Also, with the second antenna substrate 1332 blocking the radio waves radiated from the second communication unit 1330, the probability of the first communication unit 1310 receiving side lobes of the radio waves radiated from the second communication unit 1330 can be reduced.

The embodiment is a preferred embodiment of the invention. However, the invention is not limited to this and various modifications can be made without departing from the scope of the invention.

For example, while the first communication unit 1310 and the second communication unit 1330 are described as the communication units provided in the wireless communication unit 130 in the embodiment, still more communication units may be provided. For example, four communication units, that is, a first communication unit, a second communication unit, a third communication unit, and a fourth communication unit may be provided and arranged in such a way that the array antennas of the respective communication units are three-dimensionally adjacent to each other.

Also, while a configuration using three transmission-type or reflection-type liquid crystal panels corresponding to the respective colors of RGB is described as an example of the light modulation device 112 in the embodiment, the invention is not limited to this example. For instance, a combination of a single liquid crystal panel and a color wheel may be used. Alternatively, a method using three digital mirror devices (DMDs), a DMD method using a combination of a single digital mirror device and a color wheel, or the like may be employed. In the case where a single liquid crystal panel is used as the liquid crystal panel or where a DMD is used, a member equivalent to a combining system such as cross dichroic prism is not necessary. Also, other than the liquid crystal panel and DMD, any light modulation device capable of modulating light emitted from the light source can be employed without any problems.

In the embodiment, the front projection-type projector 100 which projects an image from the front side of the screen SC is described as an example of the display device. However, the invention is not limited to this example. For instance, a rear projection-type projector which projects an image from the rear side of the screen SC can be employed as the display device. Also, other display devices such as a liquid crystal display, organic EL (electroluminescence) display, plasma display, CRT (cathode ray tube) display, and SED (surface-conduction electron-emitter display) may be used.

Moreover, the communication device according to the invention is not limited to the projector 100 and may be any device which has a configuration capable of communication and executes communication. For instance, the communication device may be a personal computer. Alternatively, the invention may be applied to a communication module provided inside a printer, scanner, or various other devices.

Each functional unit shown in FIG. 1 represents a functional configuration and is not limited to any specific form of installation. That is, hardware corresponding to each functional unit is not necessarily installed. As a matter of course, a single processor can be configured to implement the functions of a plurality of functional units by executing a program. Also, apart of the functions implemented by software in the embodiment may be implemented by hardware.

Alternatively, apart of the functions implemented by hardware may be implemented by software. Also, arbitrary changes can be made to the specific detailed configuration of each of the other parts of the projector 100 without departing from the scope of the invention.

What is claimed is:

1. A display device comprising:
   a communication unit which wirelessly receives image data from an external device; and
   a display unit which displays an image based on the image data received by the communication unit;
   wherein the communication unit includes
      a first communication unit which has a first array antenna, the first communication unit receives wireless radio waves of a first frequency in a millimeter wave band via the first array antenna, and
      a second communication unit which has a second array antenna, the second communication unit receives wireless radio waves of a second frequency in a millimeter wave band that is different from the first frequency via the second array antenna, and
      a plane including the second array antenna is tilted at an angle of 10 degrees or more and 30 degrees or less to a plane including the first array antenna.

2. The display device according to claim 1, wherein a normal vector to the plane including the first array antenna and a normal vector to the plane including the second array antenna are tilted from each other so as to be spaced apart from each other on a receiving surface side of the first array antenna and the second array antenna.

3. The display device according to claim 1, wherein the first communication unit executes beam steering within a predetermined angle range about a normal vector to the plane including the first array antenna, and the second communication unit executes beam steering within a predetermined angle range about a normal vector to the plane including the second array antenna.

4. The display device according to claim 1, wherein the communication unit receives the wireless radio waves of the first frequency via the first array antenna and receives the wireless radio waves of the second frequency via the second array antenna, and thus executes carrier aggregation.

5. A projector comprising:
   a projection unit including a light source, a modulation unit which modulates light emitted from the light source, and a projection system which projects image light modulated by the modulation unit;
   a communication unit which wirelessly receives image data from an external device; and
   a casing accommodating the projection unit and the communication unit;
   wherein the communication unit includes
      a first communication unit which has a first array antenna, the first communication unit receives wireless radio waves of a first frequency in a millimeter wave band via the first array antenna, and
      a second communication unit which has a second array antenna, the second communication unit receives wireless radio waves of a second frequency in a millimeter wave band that is different from the first frequency via the second array antenna,
   the first array antenna and the second array antenna are arranged on a predetermined side of the projection unit in the casing, and
   a plane including the second array antenna is tilted at an angle of 10 degrees or more and 30 degrees or less to a plane including the first array antenna.

6. The projector according to claim 5, wherein the first array antenna is installed in such a way that a normal vector to the plane including the first array antenna and an optical axis of a projection lens included in the projection system become parallel to each other, and
   the second array antenna is installed in such a way that an angle formed by a normal vector to the plane including the second array antenna and the optical axis of the projection lens is 10 degrees or more and 30 degrees or less.

7. The projector according to claim 5, wherein the second communication unit is arranged further toward a rear side which is opposite to a projecting direction of the projection lens than the first communication unit, in the direction of the optical axis of the projection lens.

* * * * *